United States Patent
Carr et al.

(10) Patent No.: US 6,209,129 B1
(45) Date of Patent: Mar. 27, 2001

(54) PASSIVE TELEVISION PROGRAM GUIDE SYSTEM WITH LOCAL INFORMATION

(75) Inventors: Scott D. Carr, Mannford; Brian J. Castle, Broken Arrow, both of OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/139,799

(22) Filed: Aug. 25, 1998

Related U.S. Application Data

(60) Provisional application No. 60/083,845, filed on May 1, 1998.

(51) Int. Cl.[7] .......................... H04N 5/445; H04N 7/173
(52) U.S. Cl. .............................. 725/42; 725/92; 725/114; 725/138
(58) Field of Search .................... 348/6, 8, 9, 906; 707/10, 104, 202, 203, 204

(56) References Cited

U.S. PATENT DOCUMENTS

| | | | |
|---|---|---|---|
| 5,600,573 | * 2/1997 | Hendricks et al. | 364/514 R |
| 5,635,978 | 6/1997 | Alten et al. | |
| 5,659,350 | * 8/1997 | Hendricks et al. | 348/6 |
| 5,774,534 | * 6/1998 | Mayer | 379/142 |
| 5,805,204 | * 9/1998 | Thompson et al. | 348/13 |
| 5,806,075 | * 9/1998 | Jain et al. | 707/201 |

FOREIGN PATENT DOCUMENTS

WO 96/41471   12/1996   (WO) .

* cited by examiner

Primary Examiner—Andrew Faile
Assistant Examiner—Kieu-Oanh Bui
(74) Attorney, Agent, or Firm—Fish & Neave; Alexander Shvarts

(57) ABSTRACT

A program guide system is provided in which local information may be distributed to a television distribution facility for transmission to user television equipment. The local information contain information that is directed toward the particular users in a local area. The local information may be displayed automatically by cycling global information and local information.

19 Claims, 7 Drawing Sheets

PASSIVE TELEVISION PROGRAM GUIDE SYSTEM WITH LOCAL INFORMATION

This application claims the benefit of U.S. provisional patent application No. 60/083,845, filed on May 1, 1998.

BACKGROUND OF THE INVENTION

This invention relates to passive television program guides, and more particularly, to techniques for providing local information with such passive television program guides.

As used herein the term "local information" includes information related to local events (concerts, shows, community events, etc.), as well as local advertising.

Passive television program guides provide a scrolling or paged list of television program listings on a dedicated television channel. A television user may view the television program listings by tuning to the dedicated channel. The upper portion of a passive program guide display may be used to display advertising videos and associated text descriptions. The content of the text descriptions may be targeted toward particular regions. Passive television program guides are not capable of providing the user with any interactive features. (Interactive features include such advanced operations as displaying program listings in user-selected formats, listing programs by genre, ordering pay-per-view.)

Because passive television program guide advertisements may be distributed nationally from a central facility, such advertisements are suitable for promoting products and services on a national basis. If passive program guide advertisements are distributed only on a national basis, however, users will not be provided with as much useful local information as might otherwise be possible.

It is therefore an object of the present invention to provide a passive television program guide system in which users may be provided with local program guide advertising.

SUMMARY OF THE INVENTION

This and other objects of the invention are accomplished in accordance with the principles of the present invention by providing a system in which local (i.e., non-global) advertisements are provided for use in a passive television program guide associated with a television distribution facility.

The data for the local advertisements may be distributed to the television distribution facility in a number of ways. For example, local advertising data may be included in a global data stream that is transmitted from a main facility to multiple television distribution facilities. The global data stream may also contain global advertising data and program guide data. The television distribution facilities use the global data stream to generate a passive television guide, which is displayed on a dedicated television channel where it may be viewed by the users associated with the television distribution facility.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
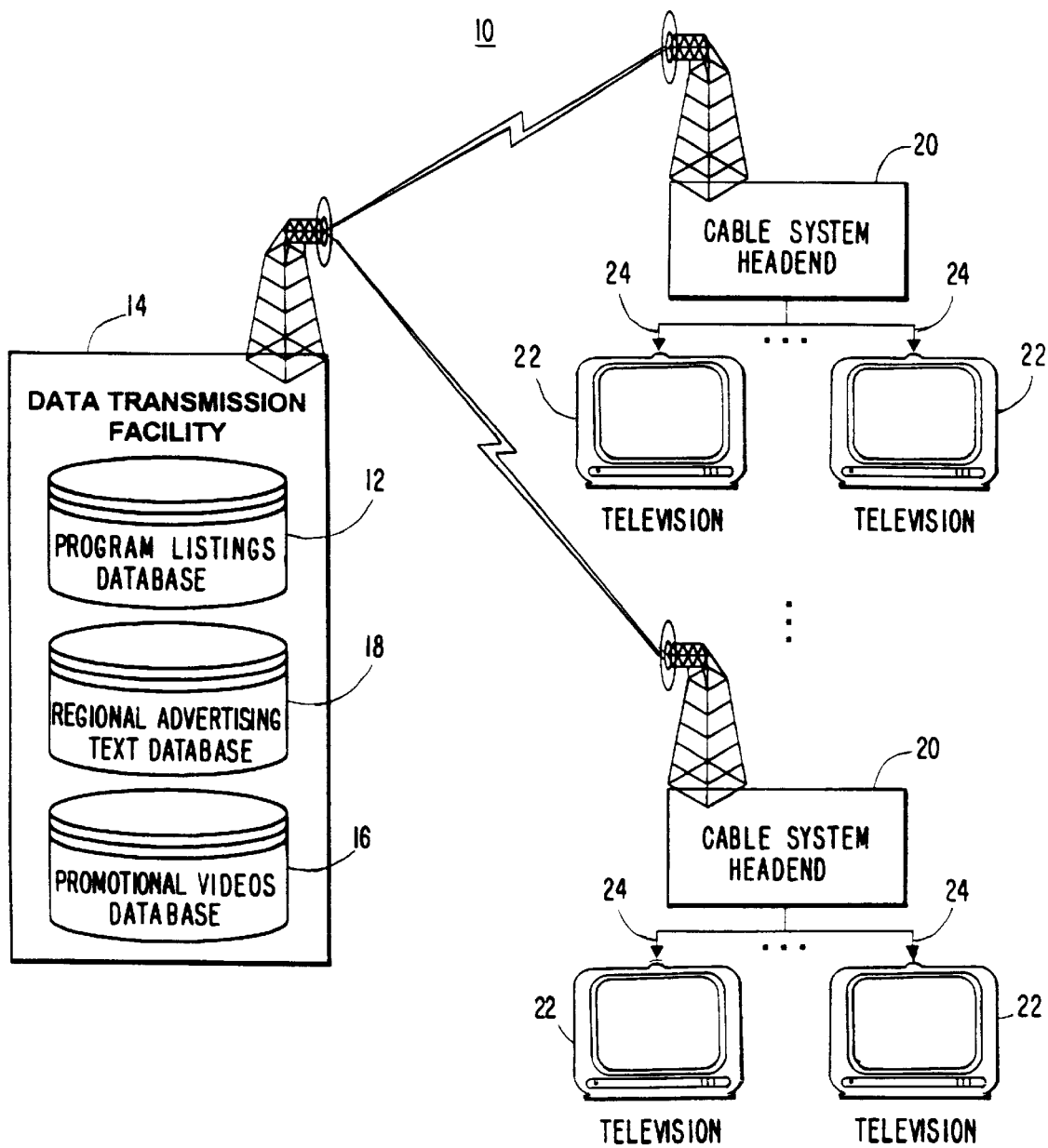
FIG. 1 is a diagram of a conventional arrangement for providing a passive television program guide channel.

A conventional passive television program guide system 10 is shown in FIG. 1. Data for television program listings such as channel, title, and broadcast time information is stored in a program listings database 12 in a data transmission facility 14. Promotional videos are stored in promotional videos database 16. Advertising text associated with the promotional videos is stored in regional advertising text database 18. The promotional videos are distributed nationally via satellite in a global video stream. The associated advertising text is distributed in a global data stream. Program listings are also distributed in a global data stream.

The global video and data streams are transmitted to multiple cable system headends 20. The cable system head ends are typically in different geographic regions. The cable system head end in each region contains a computer that extracts the advertising text appropriate for that region and the television program listings for the region. The region-appropriate advertising text is combined on a single screen with the promotional videos and the program listings for that region. The combined screen is provided to cable system subscribers at televisions 22 via cable links 24 on a dedicated television channel. The layout of a typical passive program guide screen is shown in FIG. 2.

Figure 2:
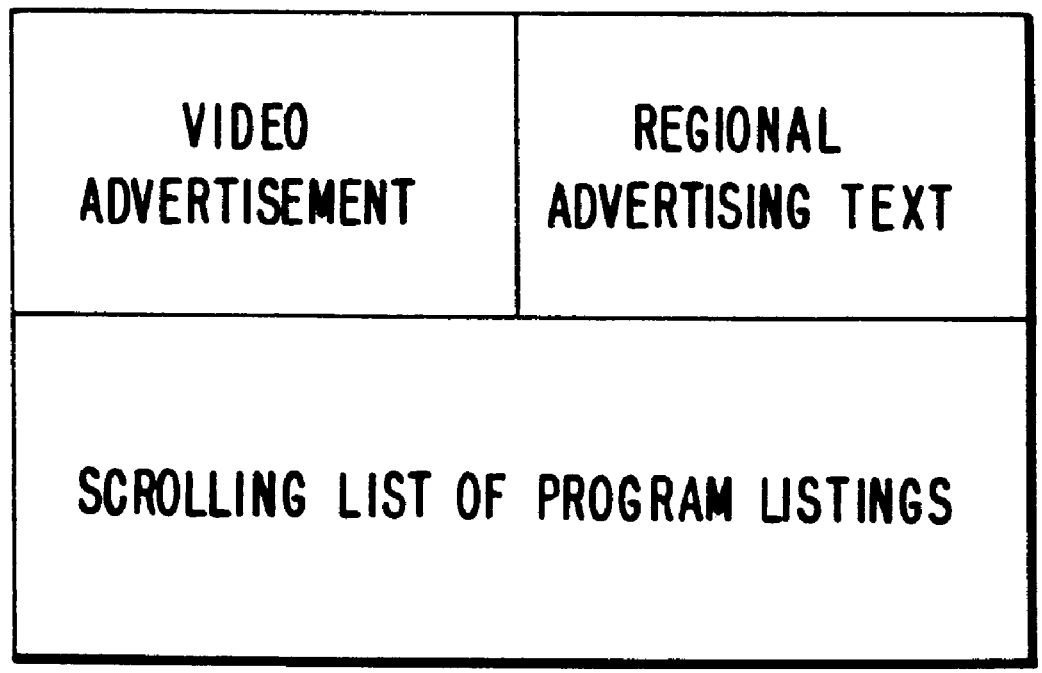
FIG. 2 is a display provided by a conventional passive program guide.

The passive program guide system of FIGS. 1 and 2 provides users with program guide information, promotional information, and regional advertising information without requiring that the user have any special television equipment other than a standard television. The passive program guide system of FIGS. 1 and 2 is representative of the system to which the present invention is applied.

Figure 3:
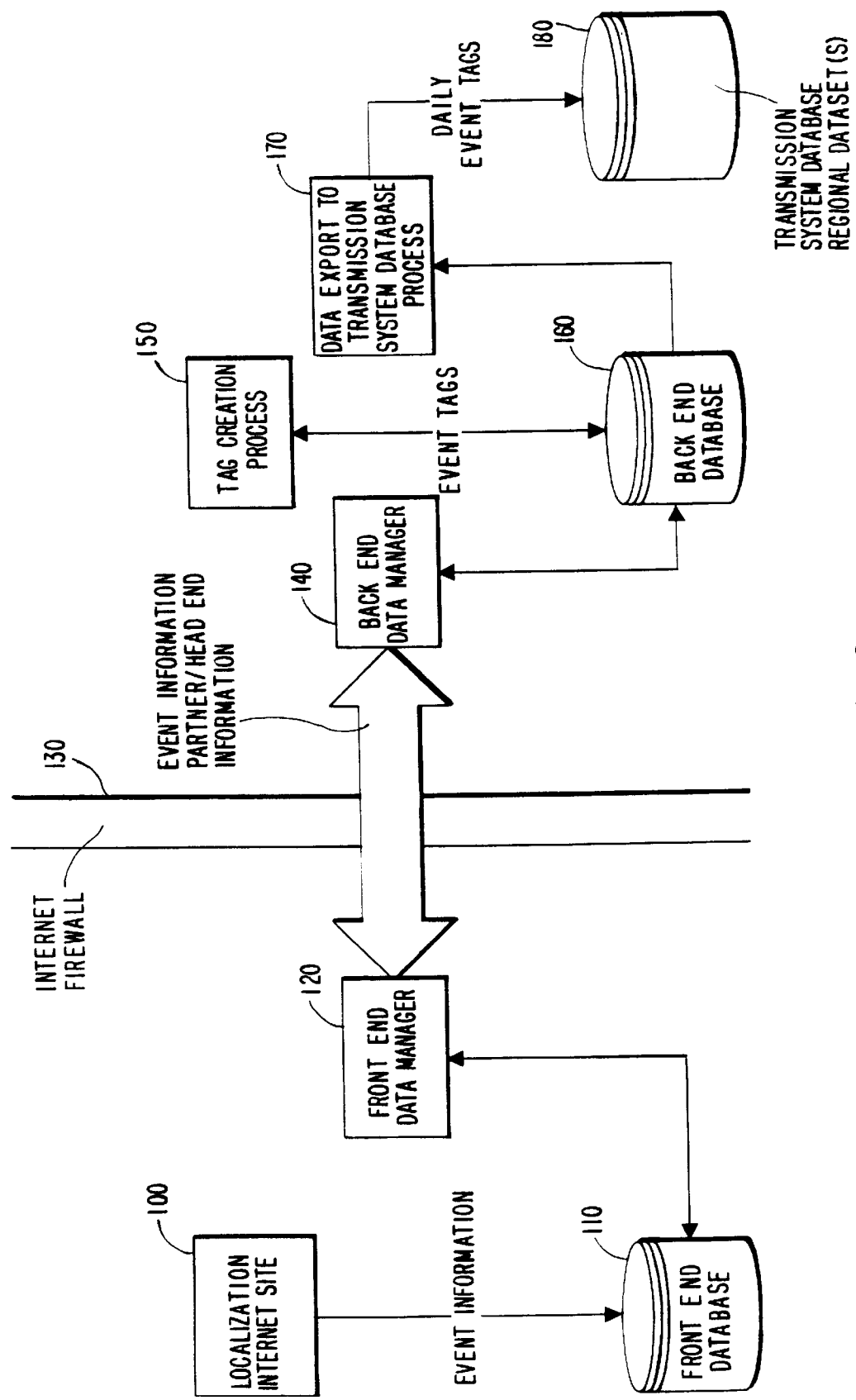
FIG. 3 is an overview of a localization back office system according to the present invention.

The program guide system of the present invention gathers local information (including but not restricted to advertisements and information about local events such as concerts, shows, etc.) into a central location from "partners" in the local communities. The program guide system provides this local information to each head end in the relevant local community. This is accomplished by means of a localization back office system, an exemplary overview of which is shown in FIG. 3. The local community based partner accesses localization Internet site 100 to provide local information to front end database 110. Front end data manager 120 accesses front end database 110 at periodic intervals to retrieve the local information. Front end data manager 120 transmits this retrieved local information across Internet firewall 130 to back end data manager 140. Back end data manager 140 transmits the local information to back end database 160 for storage. Tag creation process 150 operates on the local information stored in back end database 160 to create event tags. (Tag creation process 150 will be described in detail herein with reference to FIG. 6.) Data export process 170 selects only the event tags which correspond to that particular day, the "daily event tags," for transmission to transmission system database regional data sets 180. The "daily event tags" are then transmitted as per FIG. 1 in the next daily transmission cycle.

Figure 4:
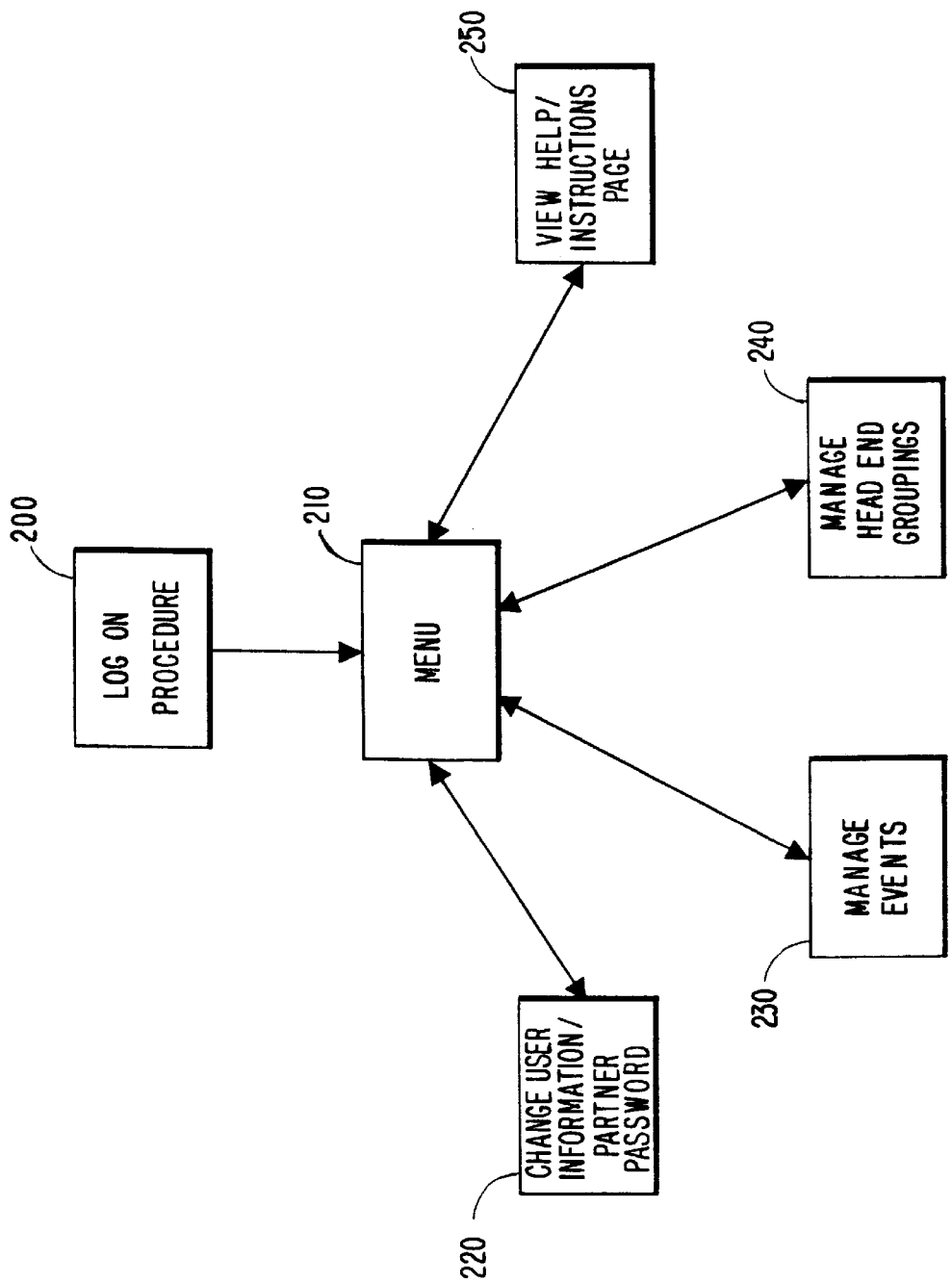
FIG. 4 is an example of an Internet-based application interface in accordance with the present invention.

Partners use an Internet-based application interface resident on localization Internet site 100 to input, check and maintain the local information. The Internet-based application interface, an example of which is shown in FIG. 4, provides the partners with the functionality to specify their areas of influence regarding how events will be displayed. After completing log on procedure 200, the partner is presented with menu 210. Menu 210 presents the partner with several options: change user information/partner password 220, manage events 230, manage high-end groupings 240 (i.e., determine and group the cable head-end systems in which these tags should be displayed; only the systems of the selected group will receive the "daily event tags" specified), and view/help instructions page 250.

Figure 5:
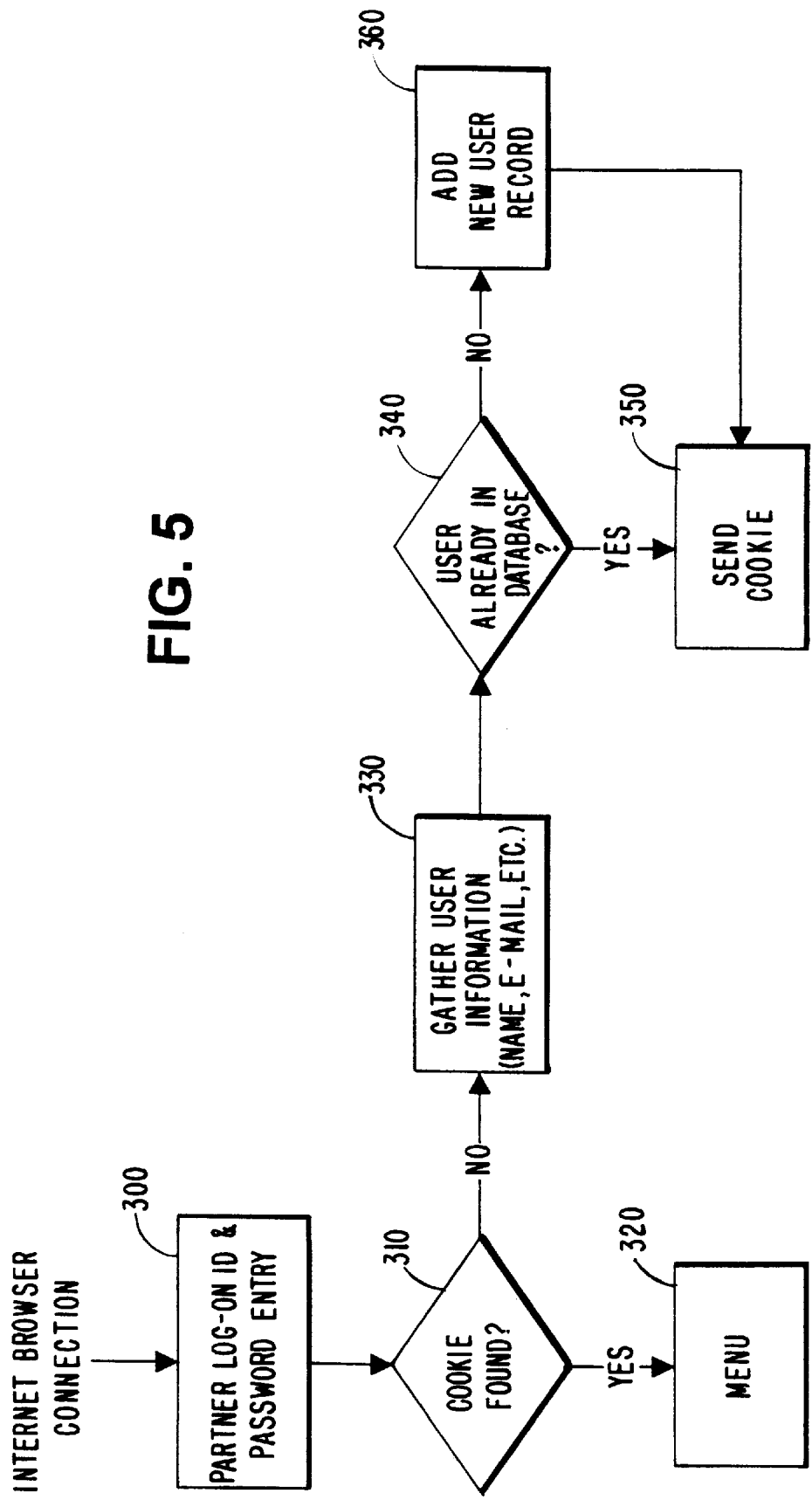
FIG. 5 is a flowchart illustrating the process of handling a partner (user) session in accordance with the present invention.

A flowchart illustrating the process of handling a partner (user) session is shown in FIG. 5. Using an Internet browser connection, partner log on ID and password entry in step 300 are performed. A cookie includes user information which is stored on the users' system that may be recalled or requested by an Internet based website. This is commonly used by web-sites to retain user configurations, such as passwords. If a cookie is found in step 310, the menu (as described in relation to FIG. 4) is presented to the partner in step 320. If no cookie is found in step 310, user information (name, e-mail, etc.) is gathered in step 330. If, in step 340, it is determined that the user is not already in the front end database, a new user record is created and the new user is added in step 360. If, in step 340, it is determined that the user is already in the front end database, a cookie is sent to the user and will be stored and retrieved upon his next and subsequent accesses in step 350 and the menu is displayed in step 320.

System and head end data is processed and moved to the back end data manager and then to the back end database on a daily basis. In addition, this system and head end data needs to be pushed by the back end data manager from the back end database to the front end database, in order to assure that the Internet-based application interface resident on localization Internet site 100 has an up-to-date list of head ends from which to address events.

An event record indicates that area within a database where the "daily event tag" information resides. During the tag selection and creation process, the localization back office system sifts through all the current event records and cross-references each event record to the list of partners, cable systems, and head ends. The events are cross-referenced with the partners who put the information in, the cable systems in which the "daily event tag" should display, and the headend(s) for those cable systems to which the "daily event tag" should be transmitted. Then the tag selection and creation process selects a set of events for each head end to be aired during the target date's localization segment (i.e., a video segment that airs twice an hour on Prevue Channel.) During this segment, "daily event tags" will be displayed for any event on any cable system which has valid events. Once an event is selected to be aired, the tag selection and creation process formats the local information into a set of tag text lines (i.e., the actual formatted text which displays on the "daily event tag") and places it in a work table (a temporary table created in the database to hold data) for delivery to the transmission system. Any data generated by the tag selection and creation process conforms to all specified tag constraints. Specified tag constraints consist of the start date for the event, the end date for the event, the length of text, etc.

Figure 6:
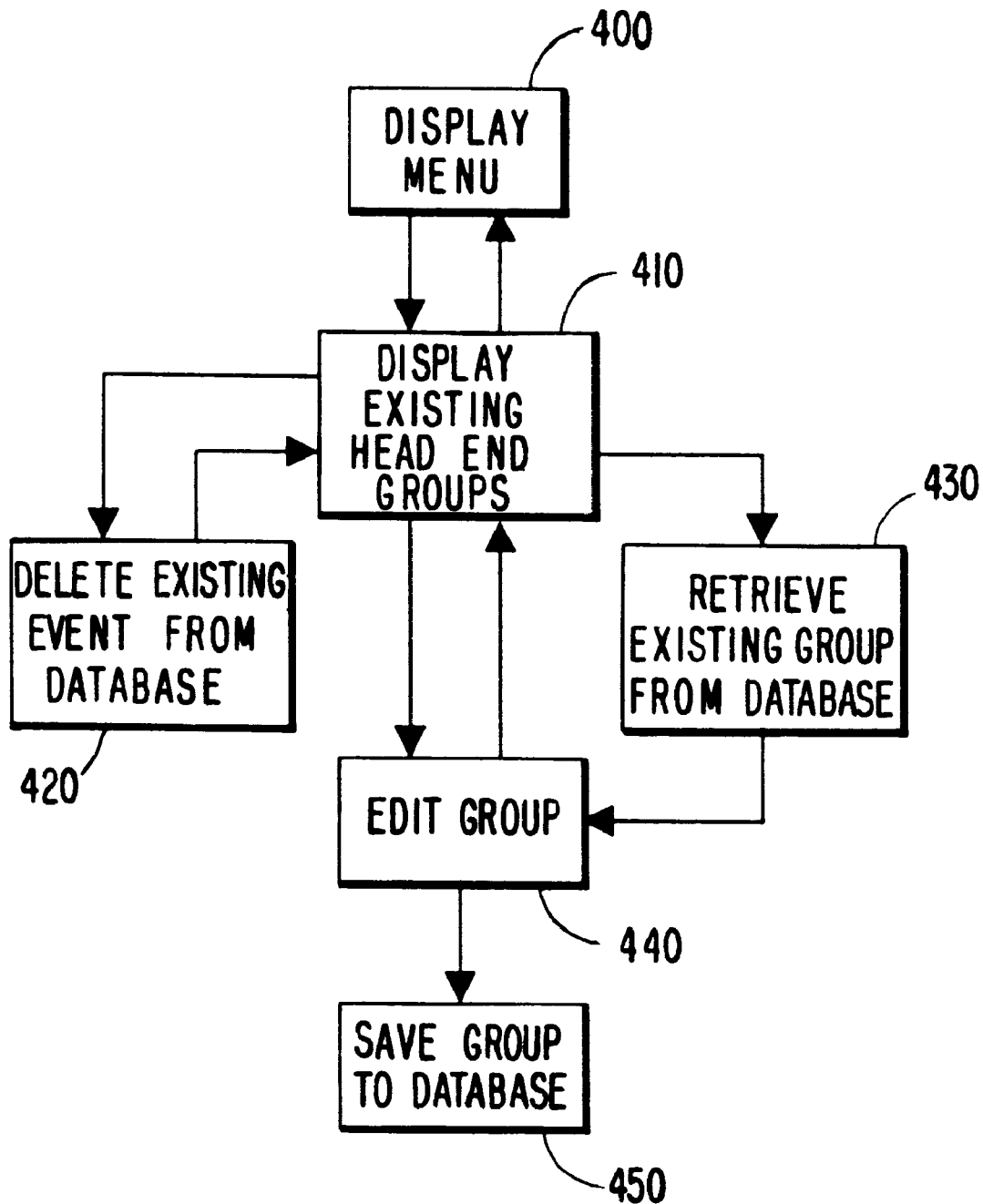
FIG. 6 illustrates a tag creation process in accordance with the present invention.

Specifically, as shown in FIG. 6, the tag creation process is instituted by the back end data manager and begins by displaying the menu to the partner at step 400 and, by interacting with the partners, the localization back office system collects local information. The existing head end groups are displayed to allow the groups to be changed or modified at step 410. Existing events which will not be aired can be deleted from the back end database at step 420. Existing groups of cable system headends can be edited in step 440 after being retrieved from the front end database at step 430. New (i.e., not previously existing) groups can be edited in step 440 immediately after being displayed at step 410 to the user to allow him to determine what he may want to change in the grouping. After editing, the groups are saved to the back end database at step 450.

Figure 7:
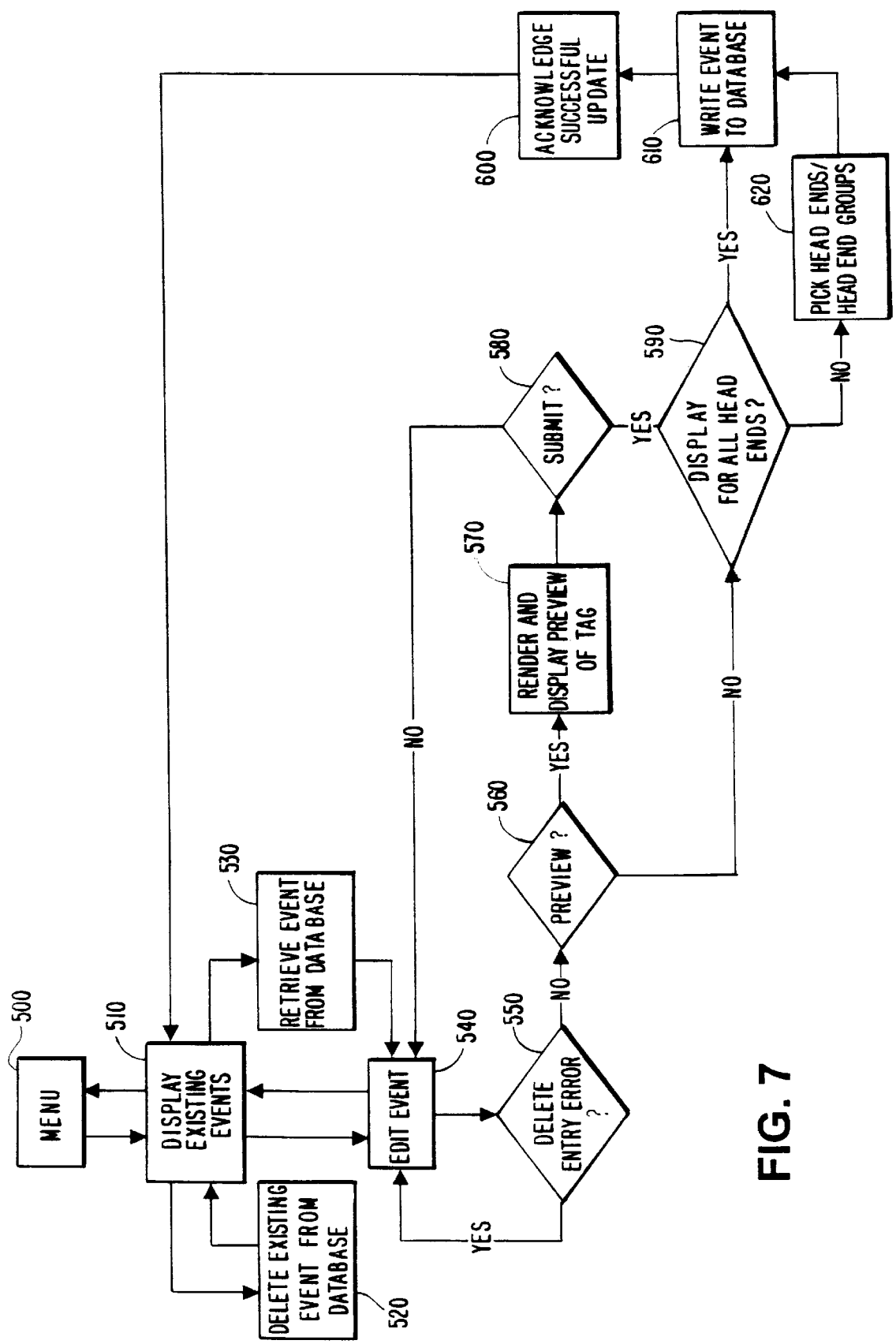
FIG. 7 illustrates additional features of the tag creation process in accordance with the present invention.

Further additional features of the tag creation process are shown in FIG. 7. Steps 500, 510, 520, 530, and 540 correspond respectively to steps 400, 410, 420, 430, and 440 in FIG. 6. If the localization back office system detects a data entry error at step 550, event editing resumes at step 540. If no data entry error is detected, the partner is offered the option of previewing the tag containing the local information at step 560. If the preview option is selected, the tag is rendered and displayed at step 570. The partner is offered the option of submitting the tag at step 580. If the partner decides not to submit the tag, event editing resumes at step 540. If the partner decides to submit the tag at step 580 or if the partner decides not to preview the tag at step 560, the partner is offered the option of displaying the tag for all head ends at step 590. If the partner selects the option to display the tag for all head ends, the event corresponding to the selected tag is written to the front end database in step 610. If the partner does not select the option to display the tag for all head ends, the partner must pick which head ends and/or head end groups to display the tag on in step 620 before the event corresponding to the selected tag is written to the front end database in step 610. After the selected tag is written to the front end database in step 610, the successful update of the front end database is acknowledged to the partner in step 600 and the existing head end groups are displayed at step 510 are so the user may see what group the selected tag will be sent to.

The foregoing is merely illustrative of the principles of this invention and various modifications can be made by those skilled in the art without departing from the scope and spirit of the invention.

What is claimed is:

1. A system in which local advertisements are distributed to a television distribution facility for transmission to user television equipment, comprising:

a front end database for storing local information provided from partners;

a front end data manager;

a back end data manager, wherein the front end data manager accesses the front end database at periodic intervals to retrieve and transmit the local information to the back end data manager;

a back end database, wherein the back end data manager transmits the local information to the back end database for storage;

a data transmission facility configured to distribute the local information to the television distribution facility; and television distribution equipment configured to use a passive television program guide to display the local information on the user television equipment.

2. The system defined in claim 1 wherein the television distribution facility further comprises television distribution equipment configured to transmit the local information from the television distribution facility to the user television equipment.

3. The system defined in claim 1 wherein the data transmission facility further comprises data transmission equipment configured to transmit the local information to the television distribution facility as part of a global data stream.

4. The system defined in claim 1 wherein the data transmission facility further comprises data transmission equipment configured to transmit the local information to the television distribution facility as part of a global data stream that contains global advertisements.

5. The system defined in claim 1 wherein the data transmission facility further comprises data transmission equipment configured to transmit the local information to the television distribution facility as part of a global data stream, wherein the television distribution facility further comprises television distribution equipment configured to transmit the local information from the television distribution facility to the user television equipment.

6. A method for using a system in which local information are distributed to a television distribution facility for transmission to user equipment, comprising:

storing local information provided from partners in a front end database;

accessing the front end database at periodic intervals;

retrieving and transmitting the local information;

storing the local-information in a back end database;

distributing the local information to the television distribution facility; and using a passive television program guide to display the local information on the user television equipment.

7. The method defined in claim 6 wherein distributing the local information further comprises transmitting the local information from the television distribution facility to the user television equipment.

8. The method defined in claim 6 wherein distributing the local information further comprises transmitting the local information to the television distribution facility as part of a global data stream.

9. The method defined in claim 6 wherein distributing the local information further comprises transmitting the local information to the television distribution facility as part of a global data stream that contains global advertisements.

10. The method defined in claim 6 wherein distributing the local information further comprises:

transmitting the local information to the television distribution facility as part of a global data stream; and transmitting the local information from the television distribution facility to the user television equipment.

11. A system in which advertisements are distributed to a television distribution facility for transmission to user television equipment, comprising:

a front end database for storing local information provided from partners;

a front end data manager;

a back end data manager, wherein the front end data manager accesses the front end database at periodic intervals to retrieve and transmit the local information to the back end data manager;

a back end database, wherein the back end data manager transmits the local information to back end database for storage;

a data transmission facility configured to distribute a selected group of the advertisements to selected groups of television distribution facilities; and television distribution equipment configured to use a passive television program guide to display the selected group of advertisements on the user television equipment.

12. The system defined in claim 11 further comprising back office equipment configured to provide the advertisements with content tags indicating the content of the advertisements.

13. The system defined in claim 11 further comprising:

back office equipment configured to provide the advertisements with content tags indicating the content of the advertisements; and television distribution equipment configured to display only those advertisements with desired content tags.

14. The system defined in claim 11 further comprising back office equipment configured to select blocking criteria that are used to determine which of the advertisements are displayed.

15. A method for using a system in which local information are distributed to a television distribution facility for transmission to user television equipment, comprising:

storing local information provided from partners in a front end database;

accessing the front end database at periodic intervals;

retrieving and transmitting the local information;

storing the local information in a back end database;

distributing a selected group of the advertisements to selected groups of television distribution facilities; and using a passive television program guide to display the selected group of advertisements on the user television equipment.

16. The method defined in claim 15 wherein distributing the local information further comprises transmitting the local information from the television distribution facility to the user television equipment.

17. The method defined in claim 15 wherein distributing the local information further comprises transmitting the local information to the television distribution facility as part of a global data stream.

18. The method defined in claim 15 wherein distributing the local information further comprises transmitting the local information to the television distribution facility as part of a global data stream that contains global advertisements.

19. The method defined in claim 15 wherein distributing the local information further comprises:

transmitting the local information to the television distribution facility as part of a global data stream; and transmitting the local information from the television distribution facility to the user television equipment.

* * * * *

UNITED STATES PATENT AND TRADEMARK OFFICE
CERTIFICATE OF CORRECTION

PATENT NO.     : 6,209,129 B1
DATED          : March 27, 2001
INVENTOR(S)    : Scott D. Carr et al.

It is certified that error appears in the above-identified patent and that said Letters Patent is hereby corrected as shown below:

<u>Column 3,</u>
Line 23, change "web-sites" to -- websites --.

<u>Column 4,</u>
Line 41, change "510 are so" to -- 510 so --.

<u>Column 5,</u>
Line 17, remove the line feed following the word "comprising"
Lines 19-24, remove the indentation so appears as follows:

5. The system defined in claim 1 wherein the data transmission facility further comprises data transmission equipment configured to transmit the local information to the television distribution facility as part of a global data stream, wherein the television distribution facility further comprises television distribution equipment configured to transmit the local information from the television distrubution facility to the user television equipment.

Signed and Sealed this

Twenty-eighth Day of January, 2003

JAMES E. ROGAN
*Director of the United States Patent and Trademark Office*